United States Patent Office.

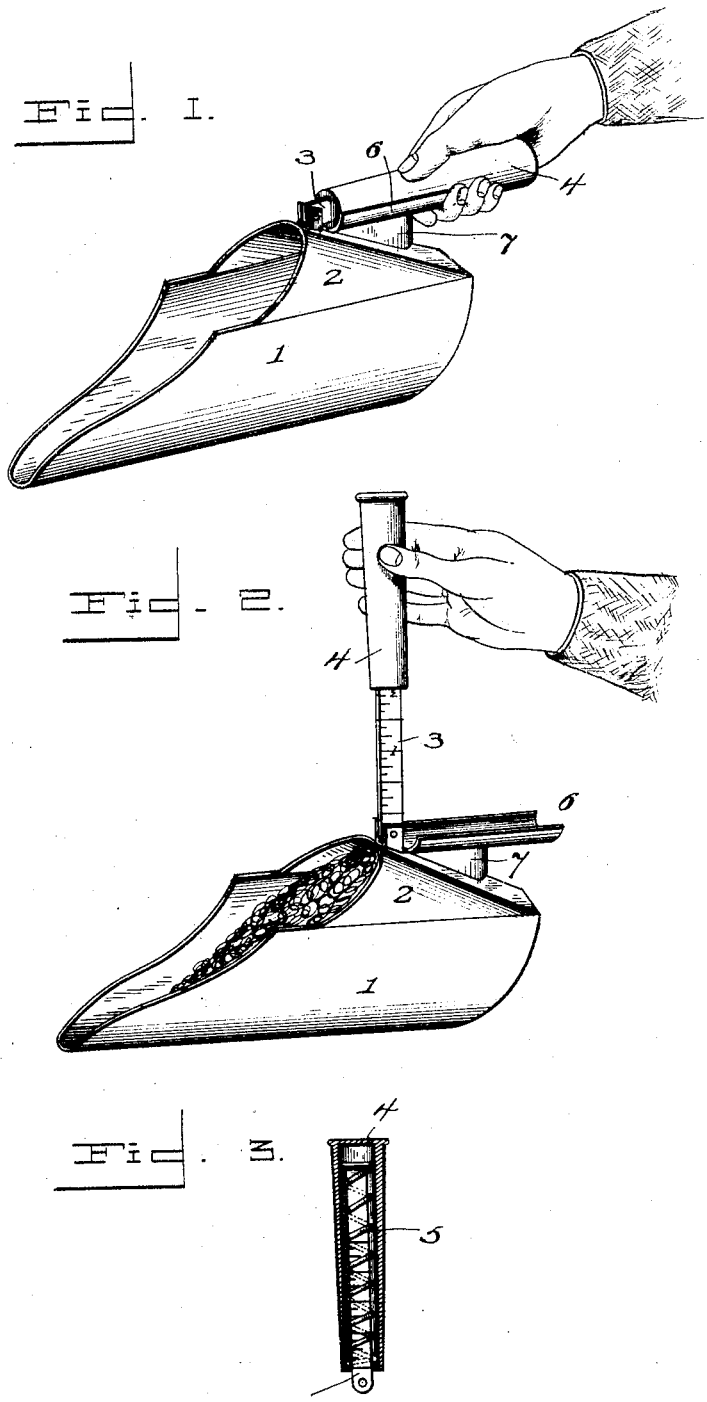

CHARLES BOHN CROFFORD, OF VICKSBURG, MISSISSIPPI.

COMBINED SCALE AND SCOOP.

SPECIFICATION forming part of Letters Patent No. 634,747, dated October 10, 1899.

Application filed February 23, 1898. Serial No. 671,262. (No model.)

*To all whom it may concern:*

Be it known that I, CHARLES BOHN CROFFORD, a citizen of the United States, residing at Vicksburg, in the county of Warren and State of Mississippi, have invented certain new and useful Improvements in a Combined Scale and Scoop; and I do declare the following to be a full, clear, and exact description of the invention, such as will enable others skilled in the art to which it appertains to make and use the same.

My invention has relation to a combined scale and scoop.

The object of the invention is to provide a simple, durable, and inexpensive device of this character, by means of which a merchant may scoop up merchandise and weigh the same at the point where it is kept, thus obviating the necessity of passing back and forth from the bin or receptacle in which the material is kept to the scales, and thereby saving much time and labor.

With this object in view the invention consists in certain features of construction and combination of parts, which will be hereinafter fully described and claimed.

In the accompanying drawings, Figure 1 is a perspective view showing the position the parts assume when my invention is used as a scoop. Fig. 2 is a similar view showing the position it assumes when used as a scale, and Fig. 3 is a detail sectional view through the handle.

In said drawings, 1 denotes the body of the scoop, preferably provided with a hood 2. To this hood is pivoted a graduated scale-bar 3, which projects into the tubular handle 4 and is connected to the upper end thereof by a weighing-spring 5.

6 denotes a combined handle-support and grip, which is inclined and is connected to the hood of the scoop by the block 7. This grip is preferably of trough-like construction, as shown, so as to receive the tubular handle.

In operation where it is desired to scoop up and weigh merchandise—for instance, sugar or meal—the tubular handle and grip are grasped in the hand, as shown in Fig. 1, and the scoop in this position thrust forward through the material. Then by simply releasing the grip and swinging the handle up the contents of the scoop may be weighed, the weight being indicated upon the graduated bar. It will thus be seen that the scoop can be conveniently manipulated by one hand, and, as shown in Fig. 1, the tubular handle 4 of the scale and the rear end of the grip 6 are jointly grasped in the right hand to load the scoop or pan, and when this has been accomplished the grip 6 is released without removing the hand from the handle 4, which is now brought to a vertical position, as shown in Fig. 2, to throw the weight of the scoop and its contents on the scale-bar 3 to ascertain the weight. By this arrangement the user of the scoop need employ but one hand, thus allowing him free use of the other hand to hold the bag or receptacle into which the contents of the scoop are to be emptied.

Having thus described my invention, what I claim, and desire to secure by Letters Patent, is—

In a scale-scoop, the combination with the scoop and the concave grip fixed thereto, of a tubular scale-handle yieldingly connected to a graduated bar pivoted to said scoop, and when resting in said grip, having its free end normally projecting sufficiently beyond the end of said grip, so that the handle may be grasped independently of the grip, substantially as and for the purpose set forth.

In testimony whereof I have hereunto set my hand in presence of two subscribing witnesses.

CHARLES BOHN CROFFORD.

Witnesses:
 GEORGE W. WAHL,
 F. J. EISELY.